United States Patent
Peduto et al.

(10) Patent No.: US 11,473,447 B2
(45) Date of Patent: Oct. 18, 2022

(54) TURBOCHARGER FOR AN INTERNAL COMBUSTION ENGINE

(71) Applicant: BorgWarner Inc., Auburn Hills, MI (US)

(72) Inventors: Davide Peduto, Mannheim (DE); Thomas Körner, Dorn Dürkheim (DE); Ivo Daniel, Mainz (DE); Thomas Dücker-Schulz, Neu-Bamberg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/052,377

(22) PCT Filed: May 6, 2019

(86) PCT No.: PCT/US2019/030823
§ 371 (c)(1),
(2) Date: Nov. 2, 2020

(87) PCT Pub. No.: WO2019/217265
PCT Pub. Date: Nov. 14, 2019

(65) Prior Publication Data
US 2021/0087945 A1 Mar. 25, 2021

(30) Foreign Application Priority Data
May 7, 2018 (DE) .......................... 102018207042.3

(51) Int. Cl.
F01D 25/16 (2006.01)
F01D 25/18 (2006.01)
(Continued)

(52) U.S. Cl.
CPC .......... F01D 25/168 (2013.01); F01D 25/18 (2013.01); F16C 17/047 (2013.01);
(Continued)

(58) Field of Classification Search
CPC .. F16C 17/047; F16C 33/1045; F16C 33/105; F16C 33/1075; F01D 25/16; F01D 25/168; F01D 25/18; F05D 2240/52
See application file for complete search history.

(56) References Cited

U.S. PATENT DOCUMENTS 4,453,837 A * 6/1984 Shimizu ................ F16C 17/047
384/368
4,479,728 A * 10/1984 Miller ................... F01D 25/168
384/369
(Continued)

FOREIGN PATENT DOCUMENTS

CN 201588879 U 9/2010
CN 103912577 A 7/2014
(Continued)

OTHER PUBLICATIONS

International Search Report for Application No. PCT/US2019/030823 dated Jul. 15, 2019, 3 pages.
(Continued)

*Primary Examiner* — James Pilkington
(74) *Attorney, Agent, or Firm* — Howard & Howard Attorneys PLLC

(57) ABSTRACT

A turbocharger for an internal combustion engine, comprises a housing (2) with a compressor blade (3) on the air side, a shaft (1) driving the compressor blade (3), and at least one radially acting rotary bearing (5) for mounting the shaft (3), wherein the rotary bearing (5) is designed as a hydrodynamic sliding bearing, wherein a stationary bearing element (6) is penetrated by the shaft (1) and a first mounting is formed on one first side of the bearing element (6) and acts axially against a bearing collar (7) rotating with the shaft, wherein an oil supply (9) for supplying the mountings is designed in the bearing element (6), wherein a plurality of flow surfaces (10) with a height (h) varying in the circumferential direction is formed on one surface of the bearing element (6) facing the bearing collar (7) in the axial direction, wherein an individually dimensioned throttle element (11, 12) is designed in the oil supply (9) for each of the two mountings.

16 Claims, 4 Drawing Sheets

(51) Int. Cl.
  *F16C 17/04* (2006.01)
  *F16C 33/10* (2006.01)
(52) U.S. Cl.
  CPC ...... *F05D 2220/40* (2013.01); *F05D 2240/52* (2013.01); *F05D 2240/53* (2013.01); *F16C 33/1075* (2013.01); *F16C 2360/24* (2013.01)

(56) References Cited

U.S. PATENT DOCUMENTS

| | | | | |
|---|---|---|---|---|
| 4,639,148 | A * | 1/1987 | Tamura | F16C 17/047 384/123 |
| 9,638,244 | B2 * | 5/2017 | Duecker-Schulz | F16C 17/08 |

FOREIGN PATENT DOCUMENTS

| | | |
|---|---|---|
| EP | 0881362 A2 | 12/1998 |
| GB | 2113778 A | 8/1983 |
| JP | H0575519 U | 10/1993 |
| JP | 2005315113 A | 11/2005 |
| WO | 2013169505 A1 | 11/2013 |

OTHER PUBLICATIONS

English language abstract and machine-assisted English translation for CN 201588879 extracted from espacenet.com database on Nov. 23, 2020, 6 pages.

English language abstract and machine-assisted English translation for CN 103912577 extracted from espacenet.com database on Nov. 23, 2020, 5 pages.

Machine-assisted English translation for JPH 05-755194 extracted from espacenet com database on Nov. 23, 2020, 5 pages.

English language abstract and machine-assisted English translation for JP 2005-315113 extracted from espacenet.com database on Nov. 23, 2020, 10 pages.

* cited by examiner

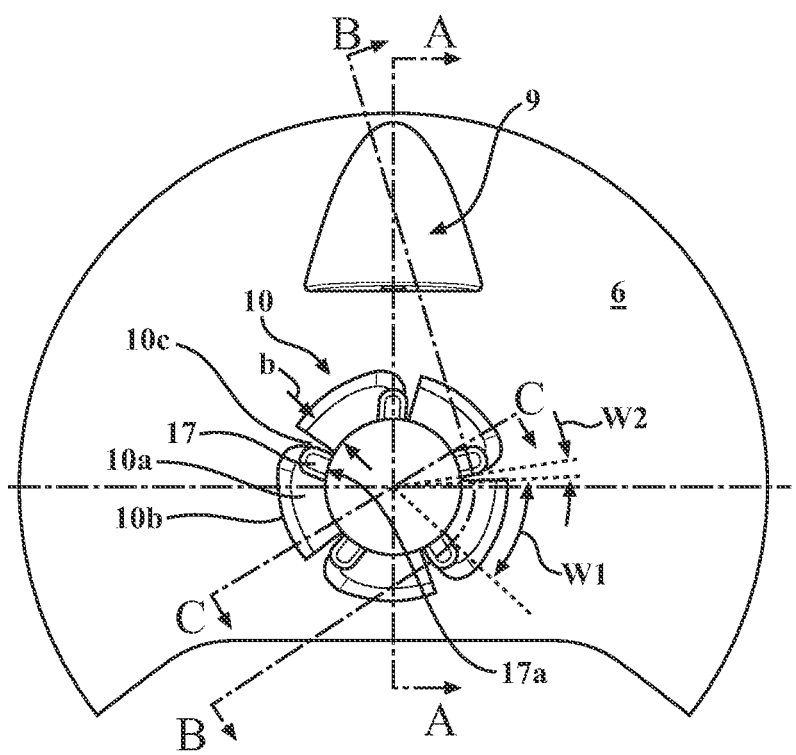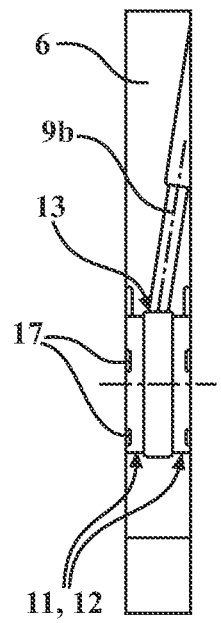
FIG. 4
FIG. 5
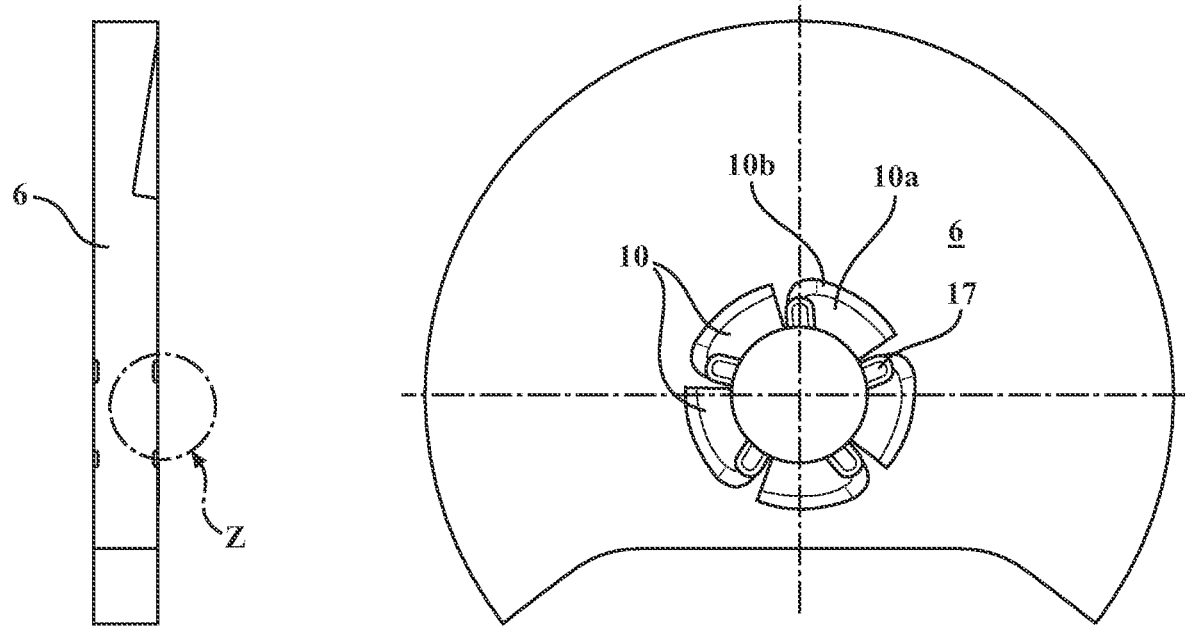
FIG. 6
FIG. 7

TURBOCHARGER FOR AN INTERNAL COMBUSTION ENGINE

CROSS-REFERENCE TO RELATED APPLICATIONS

The present application is the National Stage of International Patent Application No. PCT/US2019/030823 filed on May 6, 2019, which claims priority to and all the benefits of German Patent Application No. 102018207042.3 filed on May 7, 2018, which are hereby expressly incorporated herein by reference in their entirety.

TECHNICAL FIELD

The invention relates to a turbocharger for an internal combustion engine according to the preamble of claim 1. The invention further relates to a turbocharger for an internal combustion engine according to the preamble of claim 10.

BACKGROUND

WO 2013/169505 A1 describes an axial bearing arrangement for a turbocharger for an internal combustion engine. A bearing element is thereby penetrated in a central hole by a shaft. A plurality of wedge surfaces is formed on side of the bearing element facing in the axial direction, wherein a bearing collar, which rotates with the shaft, contacts the side of the bearing element and projects radially past the wedge surfaces. To supply the mounting, oil feeding holes are provided between the wedge surfaces and are radially located at approximately half the height of the wedge surfaces. The holes completely penetrate the bearing element and also supply a back side of the bearing element, which is supported against a sealing bushing, with oil.

It is the object of the invention to specify a turbocharger for an internal combustion engine for which a hydrodynamic axial mounting has an effective lubrication.

BRIEF SUMMARY OF THE INVENTION

This problem is solved according to the invention for a turbocharger of the type listed at the outset with the characterizing features of claim 1. Due to the individual dimensioning of the throttle elements, an optimal amount of oil and the optimal oil pressure may be guaranteed for each of the two mountings. It is thereby taken into consideration, in particular that while both mountings receive oppositely directed axial support forces during operation depending on instantaneous demands, wherein, however one of the of the mountings is more continuously loaded and/or receives greater maximum forces. In addition, in this way heat dissipation through the oil can be optimized.

A turbocharger according to the invention comprises a compressor blade driven by the shaft. The turbocharger may preferably have an exhaust gas turbine on the drive side. Alternatively to this, other drives for the shaft are also possible, for example, by an electric motor.

The oil supply may, in particular, be connected to an oil circuit of the internal combustion engine.

An axial effect of the rotary bearing is preferably understood in that the bearing element supports at least an overwhelming part, preferably all of the forces acting in the axial direction on the rotating shaft during operation and introduces them into the housing of the turbocharger.

A bearing element in the meaning of the invention is preferably accommodated stationarily or fixed with respect to the housing. This may be a substantially disk-shaped component, wherein two opposite sides of the disk function as bearing surfaces or support surfaces. These bearing surfaces may have a corresponding shaping or processing of the surfaces in order to facilitate a hydrodynamic mounting. Such a bearing element is preferably manufactured from an alloy that differs from the housing, preferably from a copper alloy.

A flow surface in the meaning of the invention is understood to be a surface structured in a targeted way, whereby a targeted hydrodynamic pressure distribution of the supplied oil is achieved by the structuring during operation.

In generally preferred embodiments of the invention, the oil supply for at least one of the mountings, preferably for both mountings, discharges at a minimal radius of the bearing element with respect to the shaft. By this means, it is prevented that a radially inner region of the bearing collar and/or the sealing bushing is not wetted with oil. In particular, due to the oil supply, the shaft itself is wetted with oil from the oil supply, which additionally improves lubrication and cooling. The oil is thereby distributed very uniformly on the different flow surfaces in the circumferential direction. Each of the flow surfaces thereby receives oil from the radially inner region, and thus at the same, low temperature.

In a first preferred embodiment of the invention, it is provided that the throttle elements are each designed as an annular gap between the shaft and the bearing element, wherein at least one annular groove, which has a larger maximum diameter than the annular gaps, is designed between the annular gaps in the axial direction. This enables in an easy way a defined distribution of the supplied oil to the first and second mounting, in that the annular gaps function as flow restrictors. The annular groove may advantageously function as a reservoir upstream of the annular gaps and ensure a constant oil flow.

In a structurally simple and appropriate detailed configuration, the oil supply thereby comprises an oil duct designed in the bearing element and discharging directly into the annular groove. Such an oil duct may, for example, be incorporated as a bore hole.

In an optimized geometry of the throttle elements, an axial width of at least one of the annular gaps, preferably of each of the annular gaps, is at least 15%, preferably at least 20% of a total width of the bearing element.

Alternatively or supplementally, it is provided in an optimized geometry that a maximum radial height of the annular groove over a surface of the shaft is at least 15%, preferably at least 20% larger than a largest radial height of the annular gap above the shaft.

Additionally alternatively or supplementally, it is provided in an optimized geometry that an axial width of the annular groove is at least 20%, preferably at least 25% of a total width of the bearing element.

In a second preferred embodiment of the invention, the oil supply comprises an oil duct, designed in the bearing element, which branches into a first subduct leading to the first mounting, and into a second subduct leading to the second mounting, wherein the throttle elements are formed by the subducts and a defined dimensioning of the subducts. By this means, a precise oil distribution may be realized in a simple way. The subducts may, for example, be manufactured by bore holes of a defined diameter.

In a preferred refinement, it is provided that the two subducts branch from the oil duct in a Y-shape and discharge respectively at opposite ends in the axial direction of an annular gap between the shaft and the bearing element. In this way, an oil supply of an inner radial area, including a wetting of the shaft, may be achieved easily and effectively.

The object of the invention is solved according to the invention for a turbocharger according to the preamble of claim 10 with the characterizing features of claim 10. Due to the radial overhang of the flow surfaces, an improved discharge of the oil of the hydrodynamic sliding bearing is achieved. An amount of oil flowing through the mounting may thereby be increased. On the other hand, a better discharge of undesired particles from the region of the mounting may be achieved.

In particular, the covering parts of the flow surfaces are essentially responsible, with the bearing collar, for the hydrodynamic properties of the mounting. The non-covering parts or the radial overhang are essentially responsible for an improved discharge of oil from the bearing. In the meaning of the invention, the overhang over the bearing collar is understood basically as an overhang over a hydrodynamically effective part of the bearing collar.

In an optimized dimensioning of the invention, it is thereby provided that a maximum diameter of the flow surfaces is at least 2%, preferably at least 5% greater than a maximum diameter of the bearing collar over/across a hydrodynamically effective area. By this means, a constant discharge of oil across the flow surfaces may be achieved.

In a generally preferred embodiment, it is provided that the flow surfaces increase monotonically in the circumferential direction across a first angular section, wherein a residual area with a constant height is formed across a second angular section following in the circumferential direction. The constant height of the residual area prevents an undefined break off of the increasing flow surface and reduces wear due to friction.

In one preferred refinement, the residual area of the second section may project by an offset elevation stepwise above a maximum height of the flow surface of the first section. This step enables a still greater removal of residual area of constant height in the case of inlet wear or operating wear, without the hydrodynamic properties of the mounting being substantially changed.

In order to ensure a constant supply of oil, an axial depression like a type of pocket is respectively designed next to each of the flow surfaces in the circumferential direction. The depression preferably has an opening aligned radially to the shaft. Such a depression or pocket functions as an oil reserve and provides oil constantly and without interruption in the area of the flow surfaces.

In one preferred embodiment, at least one of the flow surfaces has a radially inner wedge surface part and a radially outer drain part connecting thereto, wherein the drain part has a height decreasing radially outward. The wedge surface part is thereby essentially responsible for establishing the hydrodynamic pressure of the mounting. Due to the decreasing shape of the drain part, the radial discharge of the oil may be optimized, wherein primarily a continuous and uninterrupted flow in the radial direction is sought.

In a geometry optimized with respect to this, it is provided that the drain part has a curved profile in a radially aligned section. This prevents the oil from centrifuging at edges or steps. The radius of curvature of the profile is thereby preferably between 1 times and 4 times, particularly preferably between 1.5 times and 2.5 times a radial width of the wedge surface part. Due to this measurement ratio, a low-wear milling tool may be used in particular to manufacture the flow surfaces of the bearing element. As a whole, the manufacturing of the bearing element is thus less expensive.

A turbocharger according to one of claims 10 through 16 may also comprise one or more additional features of claims 1 through 9. Conversely, a turbocharger according to one of claims 1 through 9 may also comprise one or more additional features of claims 10 through 16. In the interest of improved lubrication, the favorable properties of the oil supply defined by the throttle elements and the favorable properties of the improved oil through flow of the flow surfaces may thereby dovetail. The mounting is by this means more low-wear overall, as an accumulation of 00particles causing wear in the mounting is reduced.

Further advantages and features of the invention are derived from the subsequent description of exemplary embodiments and also from the dependent claims.

Multiple preferred embodiments of the invention are subsequently described and explained in greater detail by way of the appended drawings.

BRIEF DESCRIPTION OF THE DRAWINGS

FIG. 4 shows the bearing element from FIG. 2 without the bearing collar.

FIG. 5 shows a sectional view along line A-A from FIG. 1.

FIG. 6 shows a sectional view along curved sectional line B-B from FIG. 1.

FIG. 7 shows a top view on a second side of the bearing element from FIG. 2.

DETAILED DESCRIPTION

Figure 1:
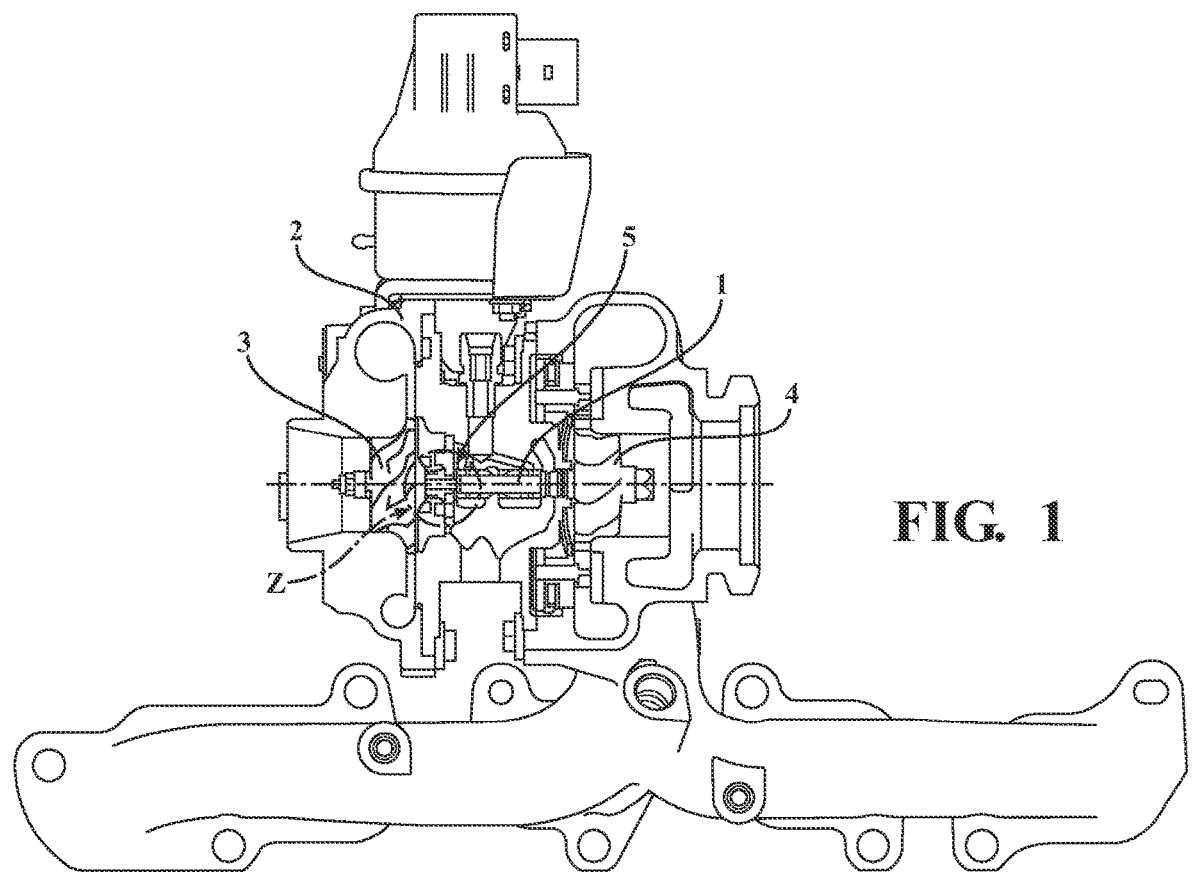
FIG. 1 shows a schematic overall view of a turbocharger according to the invention.

The turbocharger for an internal combustion engine shown in FIG. 1 comprises a central shaft 1, which is mounted in a housing 2, and drives a compressor blade 3 on the air side. Shaft 1 is presently driven by an exhaust gas turbine or an exhaust-gas-side turbine blade 4. Alternatively to turbine blade 4, another drive of the shaft is also possible, for example, by an electric motor.

Figure 2:
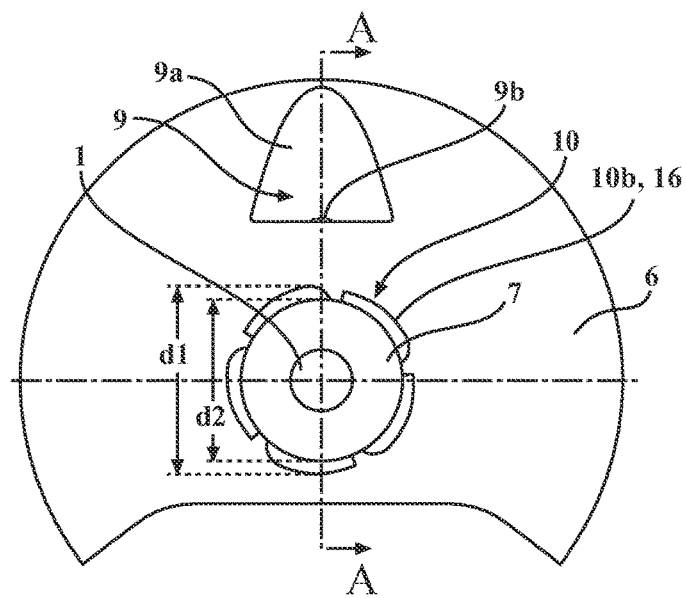
FIG. 2 shows a top view on a first side of a bearing element with bearing collar and sealing bushing from region Z from FIG. 1.

Shaft 1 is, among others, mounted by an axially acting rotary bearing 5 (see also region Z and FIG. 2, FIG. 3), which is designed as a hydrodynamic sliding mounting. A stationary bearing element 6 is thereby penetrated by the shaft. A first mounting, acting axially against a bearing collar 7 rotating with shaft 1, is designed on a first side of bearing element 6 (view from FIG. 2, FIG. 4).

Bearing element 6 additionally forms a second mounting acting axially against a sealing bushing 8 rotating with shaft 1 on an opposite second side (view from FIG. 7).

An oil supply 9 for supplying the mountings is designed in the bearing element. Oil supply 9 begins in the feed direction with a milled recess 9a in the surface of bearing element 6 formed substantially as a disk. The oil supply is further connected to an oil circuit of the internal combustion engine via ducts in housing 2.

A plurality of flow surfaces 10 is formed on one surface of the bearing element facing bearing collar 7 in the axial direction. Flow surfaces 10 have a height h, variable in the circumferential direction, across at least one part of their radial extension. Height h is defined as the distance between a surface plane of an axially facing surface of the stationary bearing element and a surface of the flow surfaces (10) in the axial direction. The flow surfaces are formed by a material-removing process (milling) from the planar surface of the bearing element.

Bearing element 6 is preferably stationarily fixed with respect to the housing. This is a substantially disk-shaped component, wherein two opposite sides of the disk function as bearing surfaces or support surfaces. Flow surfaces 10 represent a molding or processing of the surface in order to enable a hydrodynamic mounting. The bearing element is presently manufactured from an alloy that differs from the housing, in this case, a copper alloy.

According to the invention, an individually dimensioned throttle element 11, 12 is designed in oil supply 9 for each of the two mountings. In the case of the exemplary embodiment according to FIGS. 1 through 9, this is an annular gap 11, 12 in each case, which is formed between shaft 1 and bearing element 6. An annular groove 13, which has a larger maximum diameter than the annular gaps, is provided between the annular gaps in the axial direction. This enables in an easy way a defined distribution of the supplied oil to the first and second mounting, in that the annular gaps function as flow restrictors. In addition, annular groove 13 functions as a reservoir upstream of annular gaps 11, 12 and thus ensures a constant flow of oil.

Oil supply 9 comprises an oil duct 9b, designed as a bore hole, which begins in milled recess 9a and discharges directly into annular groove 13. Oil supply 9 for supplying the two mountings comprises, within the meaning of the present exemplary embodiment, milled recess 9a, oil duct 9b, annular groove 13, and throttle elements or annular gaps 11, 12.

Due to the given design of the throttle elements as annular gaps 11, 12, the oil supply 9 for both mountings thus discharges at a minimal radius of bearing element 6 with respect to shaft 1 via annular groove 13. By this means, it is prevented that a radially inner region of the bearing collar and/or the sealing bushing is not wetted with oil. Due to oil supply 9, the shaft itself is wetted with oil from the oil supply, which additionally improves lubrication and cooling. The oil is thereby distributed very uniformly on the different flow surfaces in the circumferential direction. Each of the flow surfaces thereby receives oil from the radially inner region, and thus at the same, low temperature.

In the present example, the geometry of throttle elements 11, 12 is designed so that an axial width of each of the annular gaps is approximately 27% of the total width of bearing element 6 in the area of annular gaps 11, 12.

A maximum radial height of annular groove 13 above a surface of shaft 1 is presently approximately 66% greater than a greatest height of annular gaps 11, 12 above shaft 1.

Furthermore, an axial width of annular groove 13 presently is approximately 46% of a total width of bearing element 6 in the area of annular gaps 11, 12.

Figure 11:
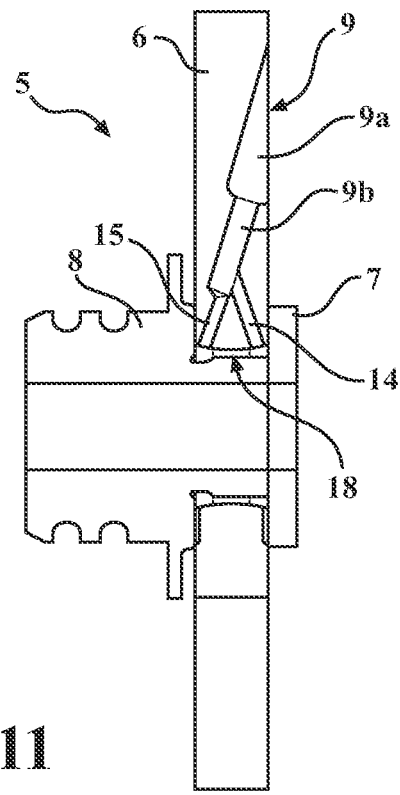
FIG. 11 shows a sectional view through the bearing element, bearing collar, and sealing bushing of a third exemplary embodiment of the invention.

With regards to the design of oil supply 9 with two individually dimensioned throttle elements, FIG. 11 shows a second possible exemplary embodiment of the invention. In this case, a milled recess 9a and an oil duct 9b are likewise formed in the bearing element. However, oil duct 9b branches into a first subduct 14 leading to the first mounting and into a second subduct 15 leading to the second mounting. In this embodiment, the throttle elements are formed by subducts 14, 15 and a defined dimensioning of subducts 14, 15. by this means, a precise oil distribution may be realized in a simple way. Subducts 14, 15 may, for example, be manufactured by bore holes of a defined diameter.

Just as in the first exemplary embodiment, the partial channels for both mountings discharge at a minimal radius of bearing element 6 with respect to shaft 1. By this means, as in the first example, each of the two sides of bearing element 6 is wetted with oil, starting from shaft 1.

The two subducts 14, 15 branch from oil duct 9b in a Y-shape and discharge respectively at opposite ends in the axial direction of an annular gap 18 between shaft 1 and bearing element 6. In this way, an oil supply of an inner radial area, including a wetting of the shaft, may be achieved easily and effectively.

As another subject matter of the invention, flow surfaces 10 in the previously described exemplary embodiments have an overhang 16 past bearing collar 7 in the radial direction. Due to radial overhang 16 of flow surfaces 10, the discharge or drainage of the oil of the hydrodynamic plain bearing is improved. In addition, an amount of oil flowing through the mounting as a whole is improved. In addition, by this means a better discharge of undesired particles from the region of the mounting is achieved.

Covering parts 17 of flow surfaces 10 are essentially responsible, with the bearing collar, for the hydrodynamic properties of the mounting. The non-covering parts or radial projection 16 are essentially responsible for an improved discharge of oil from the bearing.

In the case of the first exemplary embodiment according to FIG. 1 through FIG. 9, a maximum diameter d1 of the flow surfaces is approximately 17% larger than a maximum diameter d2 of bearing collar 7 across a hydrodynamically effective area. By this means, a constant discharge of oil across the flow surfaces may be achieved.

Individual flow surfaces 10 may each be considered as divided into a radially inner wedge surface part 10a and a drain part 10b connecting radially outwardly thereto. Drain part 10b has a height h that decreases radially outwardly. Wedge surface 10a is thereby essentially responsible for establishing the hydrodynamic pressure of the mounting. Due to the decreasing shape of drain part 10b, the radial discharge of the oil may be optimized, wherein primarily a continuous and uninterrupted flow in the radial direction is sought.

Flow surfaces 10 increase monotonically in the circumferential direction across a first angular section W1 (in FIG. 4 counter-clockwise or in the direction of rotation of shaft 1). A residual area 10c with a constant height h is formed across a second angular section W2 following in the circumferential direction. The residual area 10c of constant height h prevents an undefined break off of the increasing flow surface and reduces wear due to friction. Presently, the residual area has a height of zero or is part of the planar surface of bearing element 6.

In the present example (see FIG. 9), residual area 10c of second section W2 projects by an offset elevation k stepwise above a maximum height h of the flow surface of the first section. This step 10d enables a still greater removal of residual area 10c of constant height h, without substantially changing the hydrodynamic properties of the mounting.

In order to ensure a constant supply of oil, an axial depression 17 like a type of pocket is respectively designed next to each of flow surfaces 10 in the circumferential direction. Depression 17 is U-shaped in cross section and has an opening 17a aligned radially to the shaft. Such a depression or pocket 17 functions as an oil reserve and provides oil constantly and without interruption in the area of flow surfaces 10.

Figure 8:
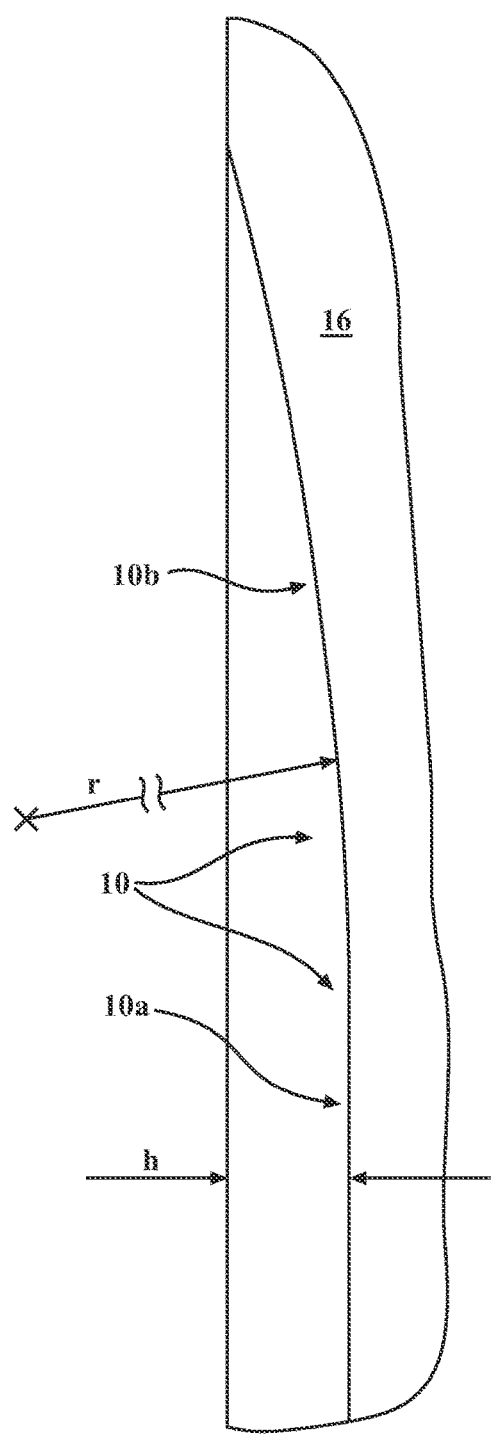
FIG. 8 shows a part of a sectional view of the bearing element from FIG. 4 along sectional line C-C.
Figure 9:
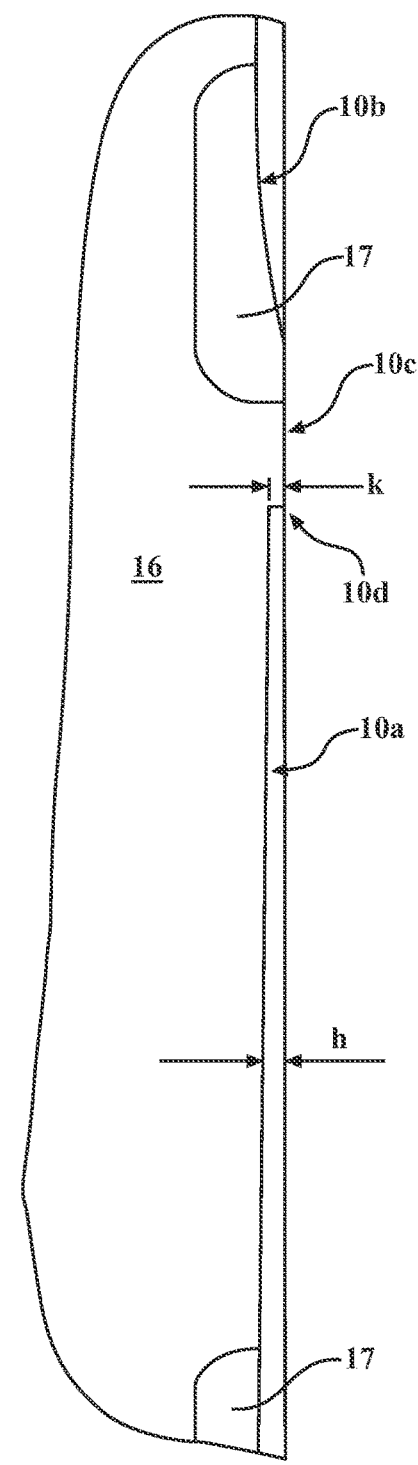
FIG. 9 shows an enlarged section of region Z from FIG. 6.

Presently, the geometry is optimized so that drain part 10b of a flow surface 10 has a curved provide in a radially-aligned section (see, for example, FIG. 8). This prevents the oil from centrifuging at edges or steps. Presently, a radius of curvature r of the profile is approximately double a radial width b of wedge surface part 10a. Due to this measurement ratio, a low-wear milling cutter may be used for producing flow surfaces 10 of bearing element 6.

Presently, diameter d2 of bearing collar 7 is equal to its hydrodynamically effective diameter, as oil pressure is applied to the entire axially-aligned surface of bearing collar 7. The periphery of the bearing collar essentially corresponds to a circle which extends on the boundaries between wedge surface parts 10a and drain parts 10b of flow surfaces 10. Expressed another way, the radius of bearing collar 7 substantially corresponds to the outer radius of wedge surface parts 10a.

FIG. 7 shows the second side of the bearing element or the back side facing the sealing bushing. Flow surfaces 10, which are formed analogously to flow surfaces 10 of the bearing collar side or of the first side are likewise formed here. The increase of wedge surface parts 10a is thus carried out here in the clockwise direction. The only partial radial covering by bearing collar 7 in the case of the first mounting corresponds in the case of the second mounting to an only partial covering by sealing bushing 8. Presently, the two mountings are thus designed identically with respect to flow surfaces 10.

Figure 10:
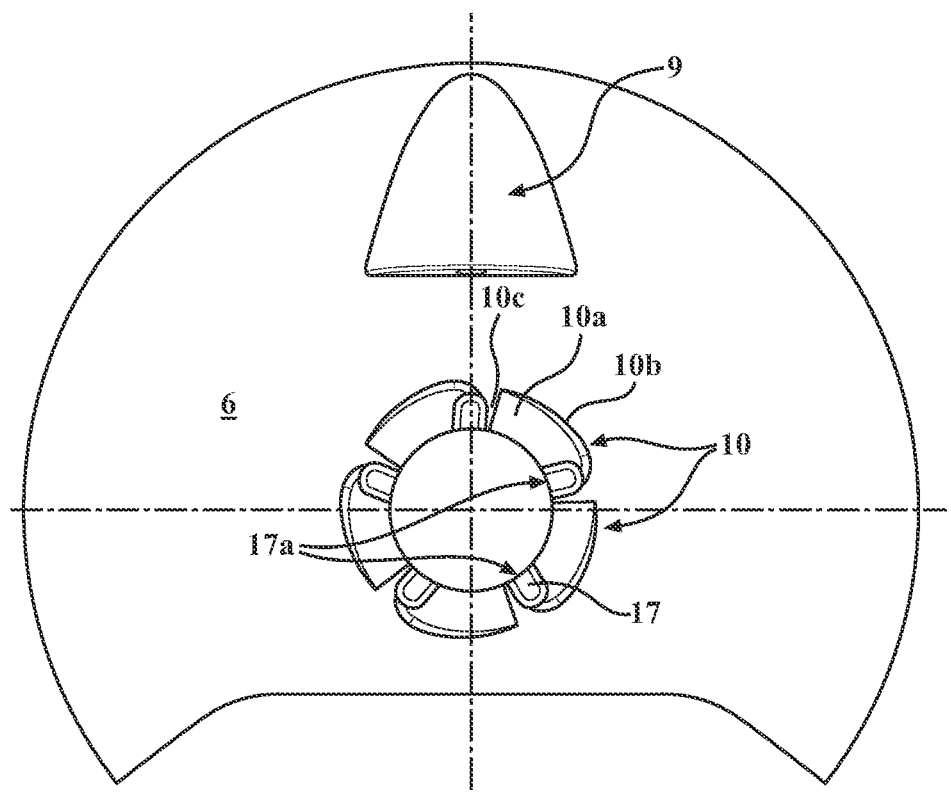
FIG. 10 shows a top view of a second exemplary embodiment of the invention relating to a shaping of the flow surfaces.

FIG. 10 shows another exemplary embodiment of the invention. Unlike the previously described example according to FIG. 1 through FIG. 9, no step 10d is provided between the highest end of wedge surface part 10a and residual area 10c lying in the surface of bearing element 6. Correspondingly, in the top view shown, drain parts 10c of the flow surfaces extend into a point in the rising direction of wedge surface parts 10a.

Figure 3:
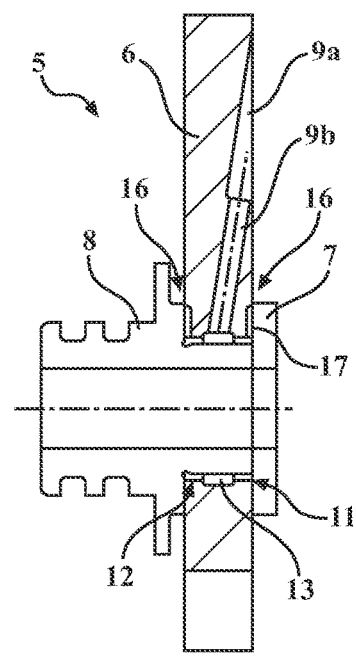
FIG. 3 shows a sectional view through the bearing element, bearing collar, and sealing bushing along line A-A from FIG. 2.

It is understood that the respective features of the exemplary embodiments (FIG. 1 through FIG. 9; FIG. 10 and FIG. 11) may be logically combined with each other depending on the application. In particular, each of the two variants of the flow surfaces (FIG. 4 or FIG. 10) may be combined with each of the two variants of the oil supply (FIG. 3 or FIG. 11). In addition, the flow surfaces according to the invention may be combined with conventional oil supply. Furthermore, the oil supplies according to the invention may be combined with conventional flow surfaces.

REFERENCE NUMERALS

1 Shaft
2 Housing
3 Compressor blade
4 Turbine blade
5 Axial rotating bearing
6 Bearing element
7 Bearing collar
8 Sealing bushing
9 Oil supply
9a Milled recess
9b Oil duct
10 Flow surfaces
10a Wedge surface part
10b Drain part
10c Residual area
10d Step
11 First throttle element (annular gap)
12 Second throttle element (annular gap)
13 Annular groove
14 First throttle element (subduct)
15 Second throttle element (subduct)
17a Pocket, depression
17a Opening of the depression
18 Annular gap
h Height of the flow surface
k Height of step 10d
d1 Maximum diameter of the flow surfaces
d2 Maximum diameter of the bearing collar
W1 First, monotonically increasing angular section
W2 Second angular section with constant height
b Radial width of the wedge surface part

The invention claimed is:

1. A turbocharger for an internal combustion engine, said turbocharger comprising:
    a housing (2) with a compressor blade (3) on an air side,
    a shaft (1) driving the compressor blade (3), and
    at least one radially acting rotary bearing (5) for mounting the shaft (1),
    wherein the rotary bearing (5) is designed as a hydrodynamic sliding bearing,
    wherein a stationary bearing element (6) is penetrated by the shaft (1) and a first mounting is formed on one first side of the bearing element (6) and acts axially against a bearing collar (7) rotating with the shaft (1),
    wherein the bearing element (6) additionally forms a second mounting on an opposite second side which acts axially against a sealing bushing (8) rotating with the shaft (1),
        wherein an oil supply (9) for supplying the mountings is designed in the bearing element (6), and
        wherein a plurality of flow surfaces (10) with a height (h) varying in the circumferential direction is formed on one surface of the bearing element (6) facing the bearing collar (7) in the axial direction,
    characterized in that
    an individually dimensioned throttle element (11, 12) is designed in the oil supply (9) for each of the two mountings and
    the throttle elements (11, 12) are annular gaps between the sealing bushing and the bearing element (6), wherein at least one annular groove (13), which has a maximum diameter that is larger than a diameter of the annular gaps (11, 12) is positioned between the annular gaps (11, 12) in the axial direction.

2. The turbocharger according to claim 1, characterized in that the oil supply (9) for at least one of the mountings discharges at a minimum radius of the bearing element (6) with respect to the shaft (1).

3. The turbocharger according to claim 2, characterized in that the oil supply (9) comprises an oil duct (9a), formed in the bearing element (6), which branches into a first subduct (14) leading to the first mounting and also into a second subduct (15) leading to the second mounting, wherein the subducts (14, 15) connect the oil duct (9a) to the throttle elements (11, 12).

4. The turbocharger according to claim 1, characterized in that the oil supply (9) comprises an oil duct (9a), formed in the bearing element (6), which discharges directly into the annular groove (13).

5. The turbocharger according to claim 1, characterized in that an axial width of at least one of the annular gaps (11, 12) is at least 15% of a total width of the bearing element (6).

6. The turbocharger according to claim 1, characterized in that a maximum radial height of the annular groove (13) above a surface of the shaft (1) is at least 15% greater than a largest radial height of the annular gaps (11, 12) above the shaft (1).

7. The turbocharger according to claim 1, characterized in that an axial width of the annular groove (13) is at least 20% of a total width of the bearing element (6).

8. The turbocharger according to claim 1, characterized in that the oil supply (9) comprises an oil duct (9a), formed in the bearing element (6), which branches into a first subduct (14) leading to the first mounting and also into a second subduct (15) leading to the second mounting, wherein the subducts (14, 15) connect the oil duct (9a) to the throttle elements (11, 12).

9. The turbocharger according to claim 8, characterized in that the two subducts (14, 15) branch from the oil duct (9a) in a Y-shape and open respectively at opposite ends in the axial direction of an annular gap (18) between the shaft (1) and the sealing bushing.

10. A turbocharger for an internal combustion engine, said turbocharger comprising:
- a housing (2) with a compressor blade (3) on an air side,
- a shaft (1) driving the compressor blade (3), and
- at least one radially acting rotary bearing (5) for mounting the shaft (1),
- wherein the rotary bearing (5) is designed as a hydrodynamic sliding bearing,
- wherein a stationary bearing element (6) is penetrated by the shaft (1) and a first mounting is formed on one first side of the bearing element (6) and acts axially against a bearing collar (7) rotating with the shaft (1),
- wherein the bearing element (6) additionally forms a second mounting on an opposite second side which acts axially against a sealing bushing (8) rotating with the shaft (1),
- wherein an oil supply (9) for supplying the mounting is designed in the bearing element (6), and
- wherein a plurality of flow surfaces (10) with a height (h) varying in the circumferential direction is formed on one surface of the bearing element (6) facing the bearing collar (7) in the axial direction, characterized in that
the flow surfaces (10) have an overhang (16) over the bearing collar (7) in the radial direction.

11. The turbocharger according to claim 10, characterized in that a maximum diameter (d1) of the flow surfaces (10) is at least 2% greater than a maximum diameter (d2) of the bearing collar (7) across a hydrodynamically effective range.

12. The turbocharger according to claim 10, characterized in that the flow surfaces (10) increase monotonically across a first angular section (W1), wherein a residual area (10c) is formed with a constant height (h) across a second angular section (W2) following in the circumferential direction.

13. The turbocharger according to claim 12, characterized in that the residual area (10c) of the second angular section (W2) projects by an offset elevation (k) stepwise above a maximum height of the flow surface (10a, 10b) of the first section (W1).

14. The turbocharger according to claim 10, characterized in that an axial depression (17) is formed in the circumferential direction adjacent to at least one of the flow surfaces (10), wherein the depression (17) has an opening (17a) aligned radially to the shaft (1).

15. The turbocharger according to claim 10, characterized in that at least one of the flow surfaces (10) has a radially inner wedge surface part (10a) and a radially outer drain part (10b) connecting thereto, wherein the drain part (10b) has a height (h) decreasing radially outwardly.

16. The turbocharger according to claim 15, characterized in that the drain part (10b) includes a curved profile, wherein a radius of curvature (r) of the profile is between 1 times and 4 times a radial width (b) of the wedge surface part (10a).

* * * * *